(12) United States Patent
Mihic

(10) Patent No.: US 6,758,638 B1
(45) Date of Patent: Jul. 6, 2004

(54) METHOD AND HOLDING DEVICE FOR A CUTTING TOOL

(75) Inventor: Peter Mihic, Gävle (SE)

(73) Assignee: Mircona AB, Gavle (SE)

( * ) Notice: Subject to any disclaimer, the term of this patent is extended or adjusted under 35 U.S.C. 154(b) by 0 days.

(21) Appl. No.: 10/070,002
(22) PCT Filed: Sep. 1, 2000
(86) PCT No.: PCT/SE00/01681
§ 371 (c)(1),
(2), (4) Date: Jun. 11, 2002
(87) PCT Pub. No.: WO01/15839
PCT Pub. Date: Mar. 8, 2001

(30) Foreign Application Priority Data

Sep. 1, 1999 (SE) .............................................. 9903083

(51) Int. Cl.$^7$ ........................... B23B 27/04; B23B 29/04
(52) U.S. Cl. ...................................... 407/107; 407/111
(58) Field of Search ................................ 407/107, 108, 407/109, 110, 111, 113, 114, 115, 116; 29/428

(56) References Cited

U.S. PATENT DOCUMENTS

| 3,894,322 A | * | 7/1975 | Pano .......................... 407/110 |
| D275,760 S | * | 10/1984 | Cochran ..................... D15/139 |
| 4,629,372 A | * | 12/1986 | Huston ........................ 407/116 |
| 4,832,541 A | * | 5/1989 | Noguchi et al. ............ 407/114 |
| 5,054,967 A | | 10/1991 | Noguchi et al. |
| 5,360,298 A | * | 11/1994 | Hedlund ..................... 407/110 |
| 6,010,281 A | * | 1/2000 | Coutat et al. ............... 407/110 |
| 6,261,032 B1 | * | 7/2001 | Duwe et al. ................ 407/110 |

FOREIGN PATENT DOCUMENTS

| DE | 1270924 B | 6/1968 |
| EP | 0802006 A1 | 10/1997 |
| WO | WO 9617706 A1 | 6/1996 |

* cited by examiner

Primary Examiner—A. L. Wellington
Assistant Examiner—Dana Ross
(74) Attorney, Agent, or Firm—Ware, Fressola, Van der Sluys & Adolphson LLP

(57) ABSTRACT

A method and holding device for locking an insert into a tool are used in metal removal machining. The tool includes an insert (2) with a upper contact surface or section (4) and a lower contact surface of section (6) and a holder (8) in which the insert (2) is arranged. The holder includes a holder body (10) and a clamping device (12). The holder body has a lower contact surface or section (14). The insert is arranged in the holder such that the upper contact surface or section (4) of the insert is brought into contact and interaction with a bottom surface (16) of a clamping device while the lower contact surface or section (6) of the insert is brought into contact and interaction with the lower contact surface or section (14) of the holder. At least one of the contact surfaces (4, 6) of the insert (2) includes protrusions (20) in the form of rounded cones, teeth or the like, that are pressed, at least partially, into the surface (14, 16) of the opposite holder and to deform the surface of the holder when the insert is arranged and subject to load in the holder (8).

15 Claims, 3 Drawing Sheets

METHOD AND HOLDING DEVICE FOR A CUTTING TOOL

BACKGROUND OF THE INVENTION

1. Technical Field

The present invention concerns a method and holding device for the clamping of an insert into a cutting tool for metal removal machining.

2. Description of the Background Art

Many different tools are used within the metal removal machining for turning and milling. The use of tools that include a hard metal insert is previously known, e.g., a so called throw-away insert, which is clamped or locked in a tool holder. The inserts are often relatively small, usually around a maximum of ten millimeters, due to the costs of the material and of the manufacturing, and also to make it possible to gain access to and carry out confined and small machining operations on a work-piece.

Clamping of an insert into a tool holder can be achieved, for example, by the holder containing an upper and a lower adjustable locking element, into the opening of which the insert is placed, followed by the locking elements being arranged with the aid of a locking screw or similar to lock the insert firmly. A number of tools with various more or less technically complicated solutions for the arrangement for clamping into the holder are known. The adjustment and locking of the insert into the holder should be as simple as possible for reasons of efficiency. The insert must be firmly clamped. The clamping force should thus preferably be distributed over a large area. The dimensions of the holders must often be small in the vicinity of the cutting region due to the requirement of achieving good accessibility. However, the smaller the holder is, the less is the rigidity obtained in the tool.

The design of interacting, prefabricated grooves or similar on the insert and the holder is also known. The purpose of these grooves is, among other things, to give a more rigid design, to prevent sideways movement of the insert and to give simpler positioning of the insert in the holder. On the other hand, problems arise when manufacturing grooves that are to interact between the insert and the holder, since this requires complicated adjustment of tolerances and an identical grinding of the grooves in both the insert and the holder, something that of course also is expensive. The alignment of lines on two objects, during which two opposite grooves must fit into each other, places high demands on accuracy during manufacture and assembly. The problem is to obtain a correct alignment and a rigid clamping of the insert into the holder also in the locked condition. A further problem associated with prefabricated grooves of various types is that various types of inserts cannot automatically be gripped into any holder. All the different types of inserts and tool holders in which this type of clamping is to be applied, that is the alignment of lines on two objects, must be provided with equivalent grooves.

A tool for metal removal machining is previously known from U.S. Pat. No. 5,054,967 that includes a holder and an insert to be clamped in the holder. The insert can be provided with grooves, and the holder can thus be provided with matching ridges. According to another embodiment, the insert is coated on its bottom surface with a soft metal layer that has greater friction than the opposite surface in the holder with which the insert interacts. The design according to U.S. Pat. No. 5,054,967 does not specify a solution to the problems that have been described in the description of the prior art given above.

EP-A1-0802006 concerns a cutting tool that contains a holder and an insert. Sharp-edged, sharp, roof-shaped protrusions with an angle at the point of between 60° and 90° are arranged on the surfaces of the insert. The roof-shaped protrusions on the insert are pressed down into the steel surface of the tool with the aid of the pressure that loads the insert when the clamping screw is tightened, whereby the surface of the tool is plastically deformed. The design of the insert with the sharp-edged roof-shaped protrusions means that the cutting tool will "ride up on" the roof-shaped protrusions. This entails a poorer locking of the insert in the tool holder. Thus the construction according to EP-A1-0802006 does not specify a solution to the problems that have been described in the description of the prior art given above.

SUMMARY OF THE INVENTION

The intention of the present invention is to achieve the clamping of an insert in a tool holder for metal removal machining, that is both rigid and simultaneously simple and to eliminate the said disadvantages described in the description of the prior art given above. One intention is thus to achieve a method and a design that simplifies the adjustment and increases the clamping force of the insert in the tool holder. Furthermore, an intention is to create improved fixing and locking. A further intention of the present invention is to eliminate any relative motion between the insert and the holder. A further intention is a method and a design of the tool by which it is simple to exchange insert and in which many types of inserts can be used, such as insert for milling, turning, etc. A further intention is to achieve a cost-effective production of the insert and the holder.

The method and the device according to the present invention solve the above-mentioned problems, and are characterized in the said purposes by that which is made clear in the claims. Thus the method according to the present invention concerns the locking of an insert into a tool for metal removal machining. The tool comprises an insert with an upper contact surface or section and a lower contact surface or section. The insert is arranged in a holder whereby the holder comprises a holder body and a clamping device. The holder body has a lower contact surface or section. The insert is arranged such that the lower contact surface or section of the insert is brought into contact or engagement with the lower contact surface or section of the holder and the clamping device is brought into engagement with the upper contact surface or section of the insert. At least one of the contact surfaces of the insert is provided or designed with protrusions or irregularities in the form of rounded cones, teeth or the like, which are brought to press or be pressed into the opposite surface or section of the holder during deformation of the same when clamping the insert.

One advantage with this solution according to the present invention is that the clamping of the insert into the holder is significantly improved in relation to conventional methods and designs. The clamping of the insert becomes very rigid. During machining, the cutting force contributes to an increased locking of the insert into the holder. By the arrangement of the insert into the holder, the protrusions of the insert are, at least partially, or wholly, pressed into and deform the surface of the holder. This occurs during a first phase through a clamping force that is brought to act on the insert by means of a clamping device, but above all it occurs during a second phase when the cutting force acts on the insert. In this way, differences in hardness of different materials of the insert and the holder are exploited. The clamping force is distributed over a very large area, since a considerable or complete contact of surfaces is achieved along the complete surface profile of the insert. This is particularly true when the contact surface of the insert is not flat, since this then by its shape will be much longer than a flat surface. The absorption of force in all directions is achieved in the interface layer between the interacting surfaces.

Furthermore, an accurate fixing is achieved, together with an accurate locking according to the present invention. A further advantage is that no adjustment of tolerances needs to be considered during interaction between the surfaces of the insert and those of the holder. Since no complicated setting of tolerances of the surfaces of the insert and the holder take place, no problems with the adjustment of the insert arises. In this way, it is very simple and easy to exchange insert in the holder. The principle can be used for essentially all types of inserts. In addition, any relative motions between the insert and the holder are eliminated in the method and the design according to the present invention. Furthermore, a very great resistance to withdrawal of the insert from the holder is achieved with the design according to the present invention.

The principle with which the insert is clamped into the tool holder can be likened to that of shape-associated locking. Neither is the surface of the holder subject to significant wear on repeated clamping of the insert. The tolerances of the protrusions on the insert are normally of the order of a few thousandths of a millimeter. These precise tolerances mean that the protrusions enter the same positions on clamping, into depressions that have been created during deformations during previous clampings of an insert with similar protrusions, whereby the surface of the insert and the surface of the holder are again deformed together.

The present invention also concerns a cutting tool for metal removal machining. The tool comprises of a holder and an insert intended to be arranged in the holder. The insert comprises an upper contact surface or section and a lower contact surface or section. The holder comprises a holder body and a clamping device, where the holder body has a lower contact surface or section. The insert is arranged such that the lower contact surface or section of the cutting tool is in contact with and interacts with the lower contact surface of section of the holder. Furthermore, the insert is arranged in the holder such that the upper contact surface or section of the insert is brought into contact with and interacts with a lower surface of the clamping device. At least one of the contact surfaces of the insert comprises a protrusions in the form of rounded cones, teeth or the like, which are arranged to be at least partially pressed into opposite surface and deform the surface of the holder when the insert has been arranged and is subject to load in the holder.

The present invention also concerns an insert for metal removal machining. The insert comprises an upper contact surface or section and a lower contact surface or section, and it includes side surfaces between the contact surfaces. The insert comprises at least one cutting edge in the interface between an upper cutting surface and a front surface. The insert is intended to be arranged and subject to load in a holder. At least one of the contact surfaces of the insert comprises protrusions in the form of cones, teeth or the like, which are intended to be at least partially pressed into an opposite surface of a holder and to deform the surface of the holder when arranged and/or when the insert is subject to load.

The protrusions in the contact surface or section of the insert according to the present invention can be formed as rounded bumps, cones, teeth, pyramids, barbs, humps or the like, which are elevated with respect to the contact surface. It is suitable if the protrusions are in the form of rounded cones, teeth or pyramids. The concept of "rounded" is used to denote the fact that the extreme top of the protrusion has a well characterized rounding-off such that the top of the protrusion does not split when the insert is subject to cutting forces. Thus, it is suitable if the top of the protrusion has a radius that lies within the interval from about 0.05 mm to about 0.2 mm, and preferably within the interval from about 0.08 mm to about 0.1 mm. The protrusions can have a height from a few tenths of a millimeter up to a few millimeters. It is suitable if the height of the protrusions is within the interval from about 0.01 mm up to about 2.0 mm, and preferably within the interval from about 0.05 mm to about 0.5 mm. The density, the distribution, between the protrusions, that is, the distance between two protrusions arranged next to each other, can be from a few hundredths of a millimeter up to several millimeters, and preferably within the interval from about 0.8 mm up to about 12 mm.

It is suitable that the protrusions are evenly distributed and spread over, or arranged along, the full extent of the contact surface or section of the insert. According to one preferred embodiment, only a part of the lower surface of the contact surface or section of the insert is equipped with rounded protrusions. It is suitable if the protrusions cover a part from about 10% up to about 50% of the area of the lower surface of the cutting tool, and preferably from about 20% up to about 33%. Since the protrusions only cover a part of the lower surface of the insert, it is suitable that these should be placed at the front edge of the insert, that is, on that area of the lower surface of the insert that faces the short side of the holder body adjacent to the object that is to be machined. In this way, it can be ensured that the protrusions are completely pressed down into the surface of the holder body and in this way achieve complete contact between the surfaces of the insert and the holder body.

The protrusions must be harder than the material of the opposite contact surface or section of the holder, since the protrusions are to sink or be pressed, at least partially, into the opposite contact surface or section of the holder when the contact surface or section of the insert with protrusions is placed into it. It is suitable if the protrusions are the same material as the insert.

The protrusions of the insert are to be completely pressed into the surface of the holder according to one embodiment of the method, the insert and the tool according to the present invention, whereby an essentially total contact of surfaces is obtained along the complete surface profile of the insert. "Total contact of surfaces" is used to denote essentially the complete lower surface of the insert being in contact with the surface of the holder.

The insert is manufactured from a material that is suitable for metal removal machining, such as, for example, a hard-metal, high-speed steel, ceramic or a ceramic material. The inserts may be coated or uncoated.

The clamping device and the holder body are manufactured in the conventional manner from steel or another suitable material, such as, for example, aluminium.

The holder includes a holder body and a clamping device, such as a clamp device. The clamping device is intended to exert a force against the insert on attachment of the insert in the holder body. The lower contact surface or section of the holder and the lower surface of the opposite insert, the lower contact surface or section, may be wedge-shaped, bowl-shaped, plane, or another geometric shape suitable for the purpose.

BRIEF DESCRIPTION OF THE DRAWINGS

The invention will now be described in more detail in the form of a non-limiting embodiment according to the present invention, illustrated with the aid of the attached diagrams, of which

DETAILED DESCRIPTION OF EMBODIMENTS

Figure 1:
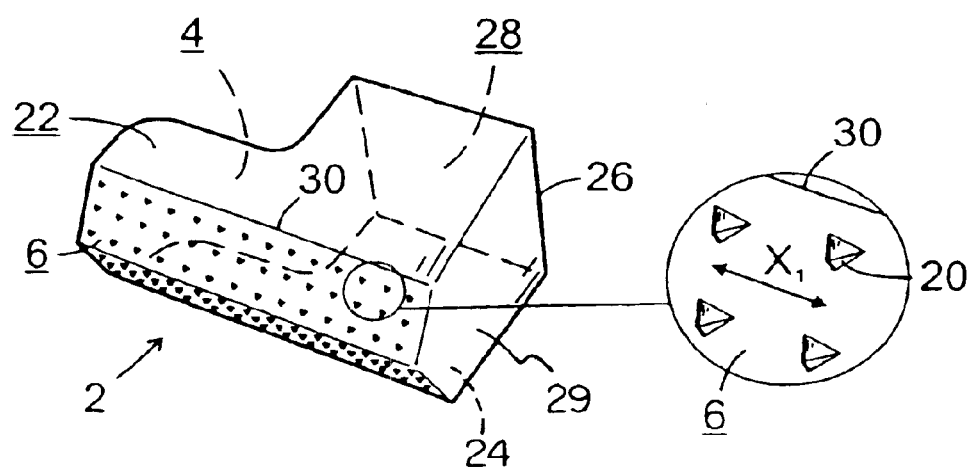
FIG. 1 shows a perspective view of an embodiment of an insert for metal removal machining, together with an enlargement of a detail of the lower contact surface or section of the insert.

FIG. 1 displays an insert 2 for metal removal machining. The insert 2 includes an upper contact surface or section 4 and a lower contact surface or section 6. Side surfaces 22, 24 stretch between the contact surfaces 4, 6. The insert 2 includes at least one cutting edge 26 in the interface between an upper cutting surface 28 and a front surface 29. At least one of the contact surfaces 4, 6 of the insert 2 include rounded protrusions 20. It is also possible to provide the insert 2 with protrusions on other sides of the insert, not just the lower contact surface or section 6 may be provided with protrusions 20, but also, for example, the upper contact surface or section 4. The lower surface 6 of the insert is equipped with protrusions in FIG. 1. Part of the insert's lower contact surface or section 6 is shown in detail in an enlargement in FIG. 1. As is shown in FIG. 1, the protrusions can be designed as rounded cones/pyramids 20 or similar. It is suitable if the protrusions are of the same material as the insert, that is, for example, they may be manufactured of a hard metal, high-speed steel, a ceramic or a ceramic material. The protrusions 20 may be produced by means of grinding, but it is more suitable from the point of view of cost if they are produced by pressing. It is suitable that they are made at the same time as the insert is manufactured. It is important that the protrusions 20 are harder than the material of the opposite contact surface or section 14, 16 of a holder for the insert 2, since the protrusions at least partially, or preferably wholly, are to sink into or be pressed into the opposite contact surface or section of the holder when the contact surface or section of the insert with its protrusions is placed into it.

The density $X_1$ between the protrusions, that is, the distance between two cones 20 or similar that lie next to each other, may be from a few hundredths of a millimeter up to several millimeters (see FIG. 1) and preferably within the interval from about 0.8 mm up to about 12 mm. It is suitable that the protrusions 20 are evenly distributed and spread over, or arranged along, the full extent of the contact surface or section 4, 6 of the insert. The extended pattern with cones or similar 20 arranged parallel to and next to each other can suitably be a fishbone pattern, a V-pattern, or similar.

Figure 2:
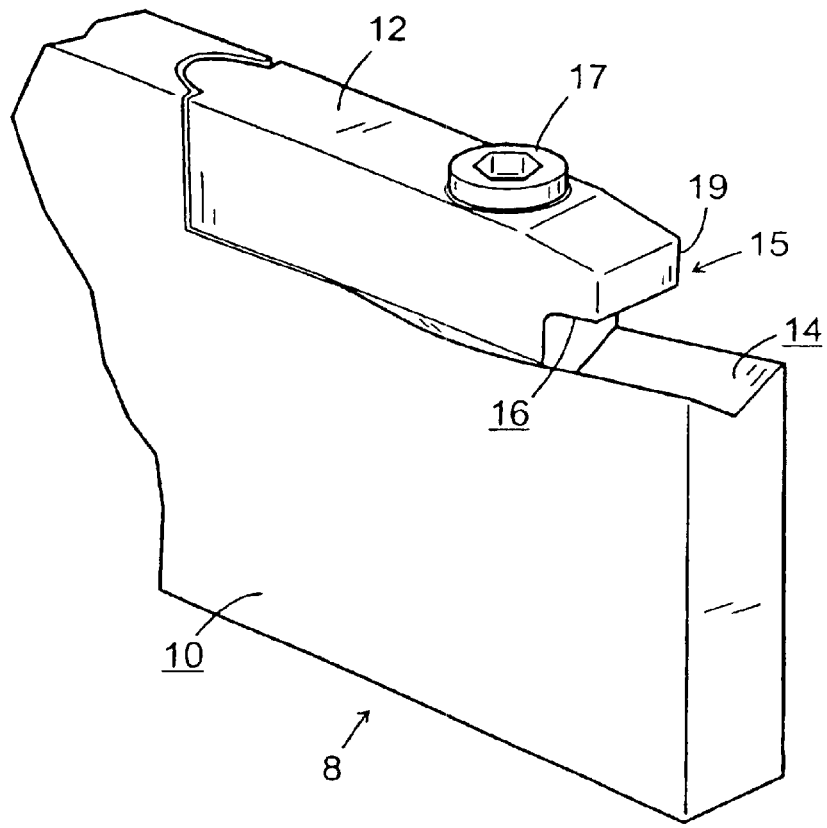
FIG. 2 shows a perspective view of an embodiment of a holder for metal removal machining.
Figure 3:
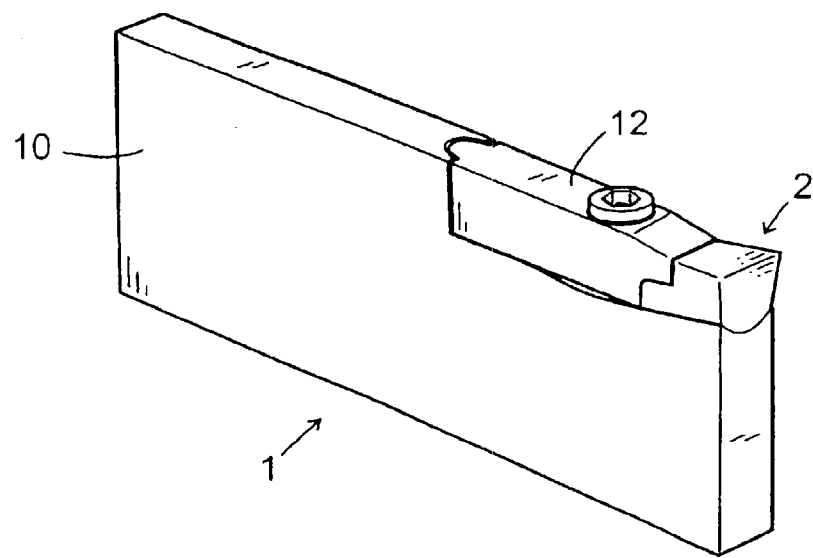
FIG. 3 shows a perspective view of a tool containing the holder shown in FIG. 2 with a clamped insert.

A holder 8 for metal removal machining is shown in FIG. 2. The holder 8 includes a holder body 10 and a clamping device 12, which can be termed the clamping arrangement. An insert attachment 15 is formed between the front parts of the holder body 10 and the clamp arrangement 12 in the holder, which creates a space for the clamping of an insert 2. The holder body 10 has a lower contact surface or section 14 and the clamp arrangement includes a lower surface 16 between which surfaces 14, 16 an insert 2 is arranged in the holder 8. The upper contact surface or section of the insert 2 is arranged in contact with and in interaction with the lower surface 16 of the clamp arrangement 12. Further, the insert 2 is arranged in the holder such that the lower contact surface or section 6 of the insert 2 comes into contact with and into interaction with the lower contact surface or section 14 of the holder 8. The clamp arrangement 12 is adjustably attached to the holder body 10 by a screw 17. The forward end 19 of the clamp arrangement can be unscrewed with the aid of an hexagon wrench or similar, which has been arranged with one end in the upper surface of the screw 17 on the clamp arrangement 12, sufficiently for the mounting of an insert 2 into the cutting tool attachment 15. The insert is placed into the holder, whereupon the insert is locked firmly into the holder with a screw force exerted by the clamp arrangement 12, by screwing down the elevated front part 19 of the clamp arrangement 12 again. As is shown in FIG. 3, a tool 1 is displayed for metal removal machining containing the holder 8 from FIG. 2 with an insert 2 clamped. When the insert 2 is arranged in the holder 8, the protrusions 20 of the insert will, at least partially, or even wholly, be pressed into and deform the surface 14 of the holder. As is shown in FIG. 3, a complete contact of surfaces has been achieved here along the complete surface profile of the insert 2, since the protrusions of the insert 2 have been fully pressed into the lower contact surface 14 of the holder body 10. In an initial phase, locking of the insert 2 into the holder 8 takes place by a clamping force brought to bear by means of the clamp arrangement 12, whereby the insert thus can come into deforming contact and interaction with the surfaces 14, 16 of the holder, but the locking takes place principally in a second phase when the cutting force acts on insert 2 during the machining with the tool 1, and thus the insert 2 is attached by pressing into the holder 8.

Figure 4:
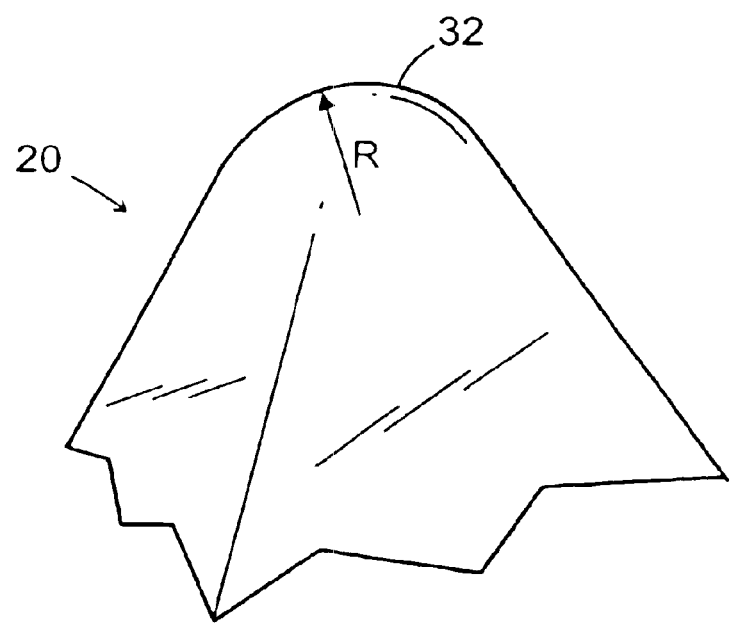
FIG. 4 shows an enlarged view of a section through a rounded top of a protrusion.

FIG. 4 shows a rounded top of a protrusion where the external part of the top 32 of a protrusion 20 has a well balanced rounding. In this way, splitting of the tops when the insert is subject to cutting force is avoided. It is suitable if the top of a protrusion has a certain radius R within the interval from about 0.05 mm up to about 0.2 mm, and preferably within the interval from about 0.08 mm up to about 0.1 mm.

Figure 5:
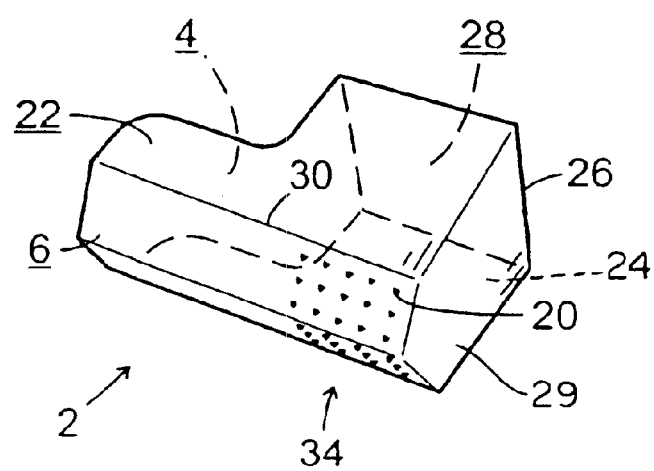
FIG. 5 shows a perspective view of a preferred embodiment of an insert.

FIG. 5 shows a preferred embodiment of an insert 2, in which only part of the lower surface of the contact surface or section of the insert is provided with rounded protrusions 20. As FIG. 5 makes clear, the protrusions cover about one third of the area of the lower surface of the insert, situated at the front edge 34 of the insert. The protrusions are thus arranged on a limited region of the front part of the lower surface of the insert. In this way, it can be ensured that the protrusions are completely pressed into the surface of the holder body and in this way achieve a complete contact between the surfaces of the insert and the holder body.

What is claimed is:

1. Method for locking of an insert into a holder for metal removal machining, the method comprising the steps of:
   (a) providing a holder, the holder comprises a holder body and a clamp arrangement where the holder body has a lower contact section which is a surface;
   (b) providing an insert with an upper contact section and a lower contact section which are surfaces, at least one of the upper and lower contact sections of the insert has protrusions thereon, the protrusions having rounded tops such that the tops do not split when the insert is subject to cutting forces;

(c) arranging the insert in the holder such that the lower contact section of the insert is brought into engagement with the lower contact section of the holder and the clamp arrangement is brought into engagement with the upper contact section of the insert; and (d) clamping the insert in the holder using the clamping arrangement so that the protrusions of the at least one of the upper and lower contact section of the insert are pushed into the holder causing deformation of the holder during clamping of the insert, the protrusions are pushed further into the holder by cutting forces exerted on the insert during metal removing machining, wherein the protrusions of the insert are fully pressed into the holder, whereby an essentially complete contact of the holder and insert is achieved along the at least one of the upper and lower contact sections of the insert having the protrusions thereon.

2. Method according to claim 1, wherein at least the lower contact section of the insert has the protrusions.

3. Method according to claim 1, wherein the protrusions having the rounded tops are chosen from the group consisting of truncated cones, truncated pyramids, rounded protuberances and unevenness, all of which have the rounded tops.

4. Method according to claim 1, wherein the upper contact section of the insert has the protrusions which are pressed into the clamping arrangement.

5. Tool for metal removal machining, comprising:

(a) a holder, the holder includes a holder body and a clamp arrangement where the holder body has a lower contact section which is a surface;

(b) an insert arranged in the holder, the insert having an upper contact section and a lower contact section which are surfaces, at least one of the upper and lower contact sections of the insert has protrusions thereon, the protrusions have rounded tops such that the tops do not split when the insert is subject to cutting forces, the lower contact section of the insert is in contact with and interacts with the lower contact section of the holder, and the upper contact section of the insert is in contact with and interacts with the clamp arrangement, so that the protrusions of the at least one of the upper and lower contact surfaces of the insert are at least partially pressed into the holder when the insert is clamped to and subject to load in the holder, the protrusions are pushed further into the holder by cutting forces exerted on the insert during metal removing machining, wherein the protrusions of the insert are fully pressed into the holder whereby an essentially complete contact of the insert and holder is obtained along the at least one of the upper and lower contact sections of the insert having protrusions thereon.

6. Tool for metal removal machining according to claim 5, wherein the protrusions have a height within a range from about 0.05 mm up to about 0.5 mm.

7. Tool for metal removal machining according to claim 5, wherein the protrusions are arranged to cover from about 10% to about 50% of the lower surface section of the insert and are arranged at a front edge of the insert.

8. Tool according to claim 5, wherein the protrusions having the rounded tops are chosen from the group consisting of truncated cones, truncated pyramids, rounded protuberances and unevenness, all of which have the rounded tops.

9. Tool according to claim 5, wherein the upper contact section of the insert has the protrusions which are pressed into the clamping arrangement.

10. Tool for metal removal machining, comprising:

(a) a holder, the holder includes a holder body and a clamp arrangement where the holder body has a lower contact section which is a surface;

(b) an insert arranged in the holder, the insert having an upper contact section and a lower contact section which are surfaces, at least one of the upper and lower contact sections of the insert has protrusions thereon, the protrusions have rounded tops such that the tops do not split when the insert is subject to cutting forces, each rounded top has a radius within a range from about 0.08 mm up to about 0.1 mm, the lower contact section of the insert is in contact with and interacts with the lower contact section of the holder, and the upper contact section of the insert is in contact with and interacts with the clamp arrangement, so that the protrusions of the at least one of the upper and lower contact surfaces of the insert are at least partially pressed into the holder when the insert is clamped to and subject to load in the holder, the protrusions are pushed further into the holder by cutting forces exerted on the insert during metal removing machining, wherein the protrusions of the insert are fully pressed into the holder whereby an essentially complete contact of the insert and holder is obtained along the at least one of the upper and lower contact sections of the insert having protrusions thereon.

11. Insert for metal removal machining and intended to be arranged and subjected to load in a holder, the holder comprises a holder body and clamp arrangement where the holder has a lower contact section which is a surface, the insert comprises:

(a) an upper contact section and a lower contact section which are surfaces;

(b) side surfaces between the contact sections of the insert;

(c) at least one cutting edge defined between an upper cutting surface and a front surface; and (d) protrusions on at least one of the contact sections of the insert, the protrusions are intended to at least partially press into the holder and to deform the holder when the insert is attached thereto and subject to a load, the protrusions having rounded tops such that the tops do not split when the insert is subject to cutting forces, the protrusions are pushed further into the holder by cutting forces exerted on the insert during metal removing machining, wherein the protrusions of the insert are fully pressed into the holder, whereby an essentially complete contact of the holder and insert is achieved along the at least one of the upper and lower contact sections of the insert having the protrusions thereon.

12. Insert for metal removal machining according to claim 11, wherein the protrusions have a height within a range from about 0.05 mm up to about 0.5 mm.

13. Insert for metal removal machining according to claim 11, wherein the protrusions are arranged to cover from about 10% up to about 50% of the lower section of the insert, and are arranged at a front edge of the insert.

14. Insert for metal removal machining according to claim 11, wherein the protrusions having the rounded tops are chosen from the group consisting of truncated cones, truncated pyramids, rounded protuberances and unevenness, all of which have the rounded tops.

15. Insert for metal removal machining and intended to be arranged and subjected to load in a holder, the holder comprises a holder body and clamp arrangement where the holder has a lower contact section which is a surface, the insert comprises:

(a) an upper contact section and a lower contact section which are surfaces;

(b) side surfaces between the contact sections of the insert;

(c) at least one cutting edge defined between an upper cutting surface and a front surface; and d) protrusions on at least one of the contact sections of the insert, the protrusions are intended to at least partially press into the holder and to deform the holder when the insert is attached thereto and subject to a load, the protrusions having rounded tops such that the tops do not split when the insert is subject to cutting forces, each rounded top has a radius within a range from about 0.08 mm up to about 0.1 mm, the protrusions are pushed further into the holder by cutting forces exerted on the insert during metal removing machining, wherein the protrusions of the insert are fully pressed into the holder, whereby an essentially complete contact of the holder and insert is achieved along the at least one of the upper and lower contact sections of the insert having the protrusions thereon.

* * * * *